May 8, 1928.
C. SCHIEBELER
1,669,148
ELECTRIC CONTROL SYSTEM
Filed April 28, 1926
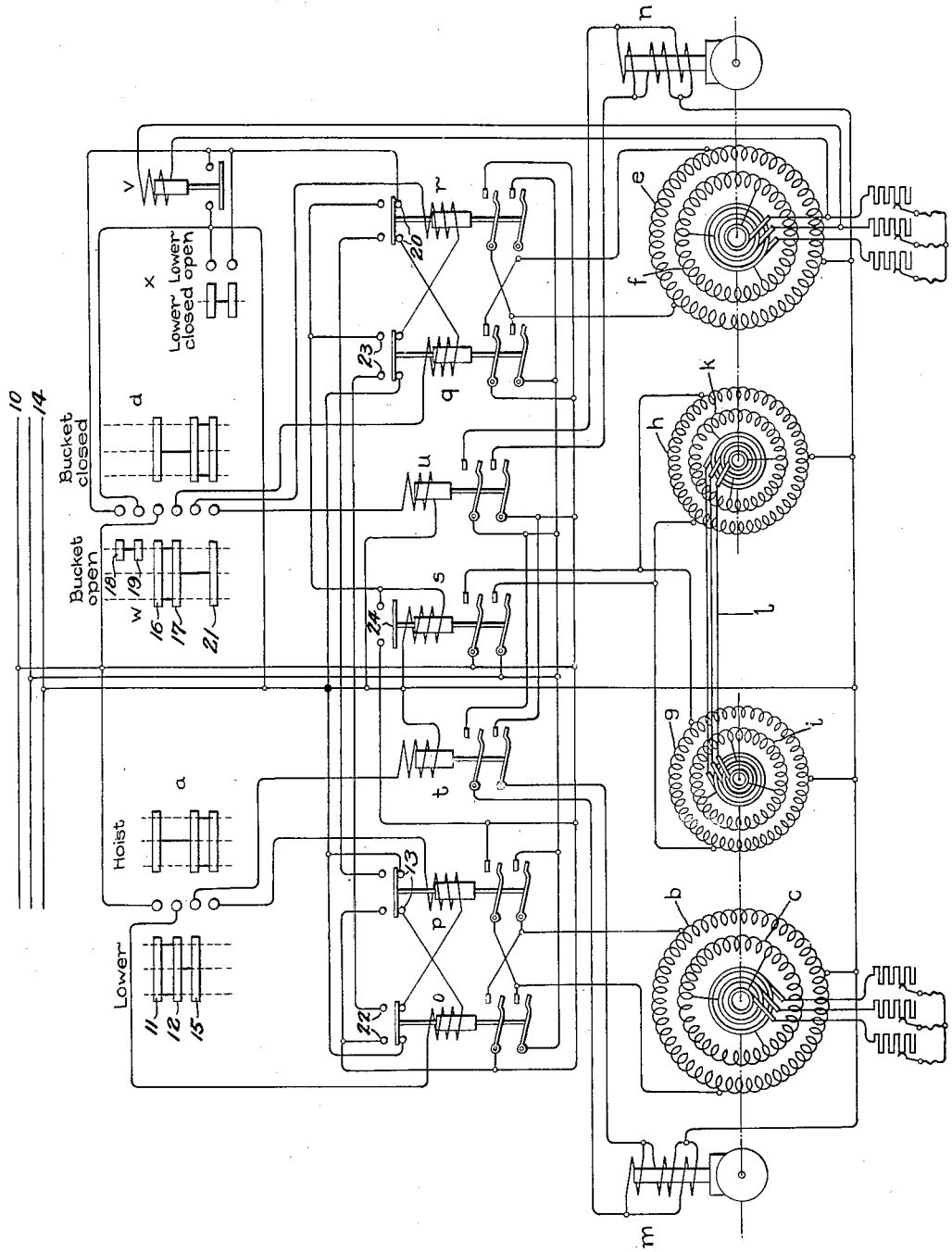
Inventor:
Carl Schiebeler,
by
His Attorney.

Patented May 8, 1928.

UNITED STATES PATENT OFFICE.

1,669,148

CARL SCHIEBELER, OF BERLIN, GERMANY, ASSIGNOR TO GENERAL ELECTRIC COMPANY, A CORPORATION OF NEW YORK.

ELECTRIC CONTROL SYSTEM.

Application filed April 28, 1926, Serial No. 105,262, and in Germany May 13, 1925.

The present invention has a particular application to hoisting installations in which two separate driving gears must work simultaneously with the same speed in spite of unequal loading of the driving gears. This requirement, as it exists, for example, in the case of locomotive lifting cranes, exists also in the case of grab winches in which there are provided two drums driven by separate motors which are not coupled mechanically, the one motor operating the closing cable drum and the other the holding or hoisting and lowering cable drum. In such installations difficulties exist, particularly with three-phase current installations, in effecting the lowering of the open grab without the grab closing by reason of the fact that the holding cable driving gear, on which the opened grab must be suspended alone, if a closing of the grab is to be avoided, is paid out by the weight of the grab and the holding drum motor assumes a speed above synchronism while the closing drum motor takes current from the source of power while operating to pay out the closing cable. This difference in operating speeds of the holding and closing drums will cause the grab to be closed before that is desired. With a view to overcoming these difficulties, different means have already been used: braking of the holding cable motor to a speed below synchronism, mechanical coupling of the two drums, driving the closing drum by an auxiliary motor with a higher speed corresponding with the speed above synchronism of the holding cable motor while the closing cable motor is not energized, and by coupling the holding cable driving gear with a three-phase generator which supplies the stator of the idly running closing motor. Each of these arrangements has its advantages and disadvantages. The braking to a speed below synchronism acts, for example, counter to the attempt to increase the production, and mechanical couplings are inconvenient, especially in the case of large outputs.

The simplest manner of solution of the above-mentioned problem is the production of an electric coupling of the two drives by connecting the slip rings of the two motors by equalizing lines. This possibility, however, again fails owing to the fact that the synchronizing force on the approach of the motors to the synchronous speed is very much reduced on account of the reduction of the rotor voltage and frequency so that running in unison cannot be maintained. In order to maintain a sufficiently great slip, a part of the starting resistance had to remain connected in. This means is, however, uneconomical because energy is continuously dissipated in the resistances and it is not always effective even for the case when the motors work in the range below synchronism because with low load the speed approaches synchronism in spite of the starting resistance connected in. This method does not produce the desired result on the connection for lowering if the travelling load drives the motor above synchronism. There is a range in which the coupling action is uncertain from about 35 percent above to 35 percent below the synchronous speed so that the motors would not remain in synchronism even with approximately equal loads throughout this speed range.

A particularly large slip between the stator and the rotor of an alternating current motor exists when the direction of the rotating field and the rotor movement are opposed. Also in this counter-connection it has been found that an asynchronous motor pulled against its rotary field by the load is able to take with it a less loaded motor of the same kind which is coupled electrically therewith and whose rotary field also is connected in the same direction of rotation like that of the first motor; that is to say, the less loaded motor is also run against the direction of its rotary field. This action is based on the high voltage and frequency produced on the counter current connection and thus the corresponding high equalizing current strength as well as the number of equalizing impulses which cause a high equalizing current even with a small lead of one motor.

It is, however, not recommended to use this coupling force produced by the counter connection of the fields in such manner that for lowering the two motors are connected to the system in counter connection and electrically coupled. The current consumption and the necessity of being obliged to lower loads which do not lower freely must be taken into consideration. Furthermore, since the empty grab only gives about 40 percent of the full load moment as effective moment in the lowering sense, and since this is distributed in a certain ratio on two motors, it is necessary for the production of sufficiently great speeds to insert very high resistance values in the rotor. This is expensive, inefficient, and inconvenient. Furthermore, the motors might be endangered by the high voltage arising with relatively high lowering speed.

According to the invention a simple arrangement is provided which avoids the above-mentioned drawbacks in all circumstances. A slip sufficient for the synchronizing is maintained for all lowering loads. For this purpose a three-phase asynchronous motor of considerably smaller output is mechanically connected to each of the two driving gears so as to serve as an equalizing machine. The slip rings of these two auxiliary machines are connected in the same phase by equalizing lines, no starting resistances for these motors being used. The equalizing motors, for example, by connecting the fields opposite to the direction of rotation of the rotors, are so connected or so designed that they always work with a slip sufficient for producing the necessary coupling force.

The auxiliary motors have the same output and take no current and run idly while the two driving gears run at the same speed, since on equality of phase the slip ring voltages cancel one another. In case the one driving gear is loaded heavier and tends to remain behind, a phase displacement arises which has the result of causing an equalizing current to flow corresponding to the value of the turning moment. For the selection of the size of coupling motors, the greatest load difference to be transferred which can take place in operation is therefore the deciding factor.

The greatest difference in the load occurring in double motor grab driving gear, which, as mentioned, occurs on lowering the open grab may be reduced by disconnecting the closing cable motor with lifted brakes to prevent the electric braking of the closing cable motor setting in upon reaching synchronous speed. First, therefore, the holding and the closing cable motors are connected in the lowering sense and also the two stators of the auxiliary motors in the lifting sense so that the electric coupling is closed from the beginning of the movement. The closing cable driving gear on which no load hangs is now rapidly accelerated. After reaching the synchronous speed, by means of a voltage control device depending upon the rotor voltage of the closing cable motor, the closing cable motor is cut off so that from this moment the coupling has only to transfer the moment for overcoming the frictional resistance in the closing cable driving gear as well as the moment for accelerating the armature and the driving gear masses to the speed above synchronism to be obtained. Maintaining the coupling moment to be transferred small is also desirable on the counter-current connection of the auxiliary machines for the reason that not only must the auxiliary motors be increased, if the closing cable motor were not to be cut off, but also a reduction of the lowering speed would occur. At the beginning of the transfer of the coupling moment by the auxiliary machines an auxiliary electric braking sets in since a part of the moment of the weight of the empty grab acting on the holding cable alone available must serve for production of the coupling force.

The electric coupling can also be used on lowering the closed grab in order to prevent an opening of the grab with lagging closing cable motor. The coupling force to be transferred is in this case smaller since a certain amount of coupling between the two driving gears exists through the block and pulley of the closing cable.

The use of the coupling motors for the purpose of synchronizing two driving gears on lifting can take place in the same manner by connecting their rotary fields in the lowering sense so that for the equalizing action, a sufficiently high voltage and frequency is available. The control is however, and this is particularly important for grap operation, simpler if the auxiliary motors are connected always in one direction. In order to obtain, for this case, however, still a sufficient synchronizing force, it is necessary to select auxiliary motors with a higher speed than that of the main motors. If, for example, 750 revolution machines are used for the main motors, 1500 revolution machines can be used as auxiliary motors, which on raising the load are compelled to run with the speed of the main motors. At this speed, however, there is available half of the stationary voltage and half the frequency which equalizing action is sufficient to effect the synchronization with small differences in load.

The selection of the higher speed for the auxiliary motors has quite a special advantage also for the lowering with high lowering speeds with counter-current connection of the auxiliary motors. Assume that at a double synchronous lowering speed, that is with 750 revolution machines, lowering is to take place at 1500 revolutions. The voltage occurring with the 1500 revolution auxiliary motors is first the double stationary voltage compared with what would be three times in case 750 revolution auxiliary machines were used. Still more favourable is this ratio on the selection of 600 revolution main machines. In this case the inconvenient high voltages are avoided which may easily endanger the motors and which for the equalizing action, in this degree are not necessary.

The single figure of the drawing shows a system incorporating the invention.

In the drawing, $a$ indicates diagrammatically the master switch for the holding cable motor, of which $b$ is its stator, and $c$ is its rotor. $d$ represents the controller for the closing cable motor whose stator is indicated with $e$ and its rotor with $f$. $g$ and $h$ represent the stators and $i$ and $k$ the rotors of the two auxiliary motors connected with one another by the equalizing lines $l$, which motors are rigidly coupled with the rotors $c$ and $f$ of the two main motors. $m$ and $n$ represent the two electromagnetic brakes. For connecting in the two main motors the reversing contactors $o$ and $q$ operate for the lowering direction, and the reversing contactors $p$ and $r$ for the raising direction. The stators of the two auxiliary motors are connected through the common contactor $s$ to the supply system. $t$ and $u$ designate the brake lifting line contactors. $v$ represents voltage control device which cuts off the closing cable motor on lowering the open grab. $w$ represents contacts which are effective to bridge over the contact controlled by the voltage control device $v$. $x$ represents a reversing switch with the positions "Lower open" and "Lower closed".

The operation of the control is explained for the operation of lowering the open grab as follows:—

On passing the controller $d$ to the position "Bucket open" and the controller $a$ to the "Lower" position, the two lowering contactors $o$ and $q$ and also the brake lifting contactors $t$ and $u$ then respond on the first position of the controllers. The circuit for the winding of contactor $o$ may be traced from the conductor 10 of the source of supply, segments 11 and 12 of the controller $a$, coil of contactor $o$, lower auxiliary switch contacts 13 of contactor $p$ to conductor 14 of the source of supply. The circuit for the winding of contactor $t$ is from the conductor 10, through segments 11, 12 and 15 of controller $a$, winding of contactor $t$ to conductor 14 of the source. The circuit for the winding of contactor $q$ is from conductor 10, segments 16 and 17 of controller $d$, winding of contactor $q$, lower auxiliary switch contacts 20 of contactor $r$, segments 18 and 19 of controller $d$ to conductor 14. The circuit for the winding of contactor $u$ is from conductor 10, segments 16, 17 and 21 of controller $d$, winding of contactor $u$ to conductor 14. The closing of the contactors $o$ and $q$ closes a circuit through the series-connected upper auxiliary contacts of these two contactors and the coil of the contactor $s$, through which circuit the protective device $s$ is caused to respond. This circuit may be traced from conductor 10, upper auxiliary switch contacts 22 of contactor $o$, upper auxiliary switch contacts 23 of contactor $q$, winding of contactor $s$ to conductor 14. By this means the stators of the two auxiliary motors $g$ and $h$ are connected to the system in the lifting sense. Through the auxiliary contact 24 of the contactor $s$, a self-holding circuit for the contactor $s$ is closed so that after the disconnection of the closing cable motor $ef$, the protective device $s$ does not open. On further switching of the two controllers $a$ and $d$, the rotor resistances of these motors are short-circuited through an arrangement not shown but well understood by those skilled in the art, and both motors are thus accelerated. In the second position of the controller $d$, the coil current for the lowering contactor $q$ passes through the contacts of the voltage protective device $v$, which was energized to pick up in response to the rotor voltage of the closing motor $ef$ immediately after the energization of this motor. The reversing switch stands in the position "Lower open" (that shown on the drawing) so that the interrupting contact of the voltage control device is not continuously bridged over. If this energization of the relay $v$ falls off on the voltage of rotor $f$ reaching about 10 to 20 percent of the stationary voltage, that is shortly before reaching the synchronous speed, the current for the lowering contactor $q$ of the closing cable motor is also interrupted by the opening of relay $v$, so that the latter is cut off and the coupling motors $i$ and $k$ from this moment have only to take care of the load of the idly running driving gear of the closing drum. On lowering the closed grab the contacts of the voltage control relay $v$ are shunted by the reversing switch $x$ in all lowering positions, so that a disconnection of the closing cable motor and the consequent opening of the grab is avoided. On raising the grab or bucket, exactly as in the case of the lowering of the grab, the contactor $s$ is energized through the series-connected upper auxiliary contacts of the two hoisting contactors $p$ and $r$, and thus the two auxiliary motors are also connected in the lifting sense. During the emptying and the closing of the grab only the closing cable motor is energized. The circuit for the protective device $s$ is therefore not closed and the synchronizing device is without action during the emptying and the filling of the grab.

The controllers $a$ and $d$ may be selectively or jointly operated in any suitable manner by a common operating device, as will be understood by those skilled in the art. Since this feature is not of the essence of the invention, it has not been shown or described specifically. The possibility also exists of selecting auxiliary motors with lower speed than that of the main motors. These are then run above synchronism with the speed of the main motors and have available for the equalization a sufficiently high voltage and frequency. It is certainly necessary in this case to connect also the rotors of the main motors by equalizing lines in order to ensure uniform running during the starting operation, since the equalizing action of the auxiliary motors only takes place with increasing speed. Since, however, with small outputs low speeds and also with great outputs high speeds are not usual, it is recommended to employ high speed machines as auxiliary motors.

What I claim as new and desire to secure by Letters Patent of the United States is:

1. In combination in a system of motor control for a grab bucket hoist or the like, an alternating current asynchronous hoisting and lowering drum main motor, a mechanically independent alternating current asynchronous closing drum main motor, and electrical equalizing connections between said motors comprising an auxiliary asynchronous motor of smaller capacity mechanically connected to each of said main motors and arranged to have a greater slip than the associated main motor, the said auxiliary motors having their rotors electrically interconnected.

2. In combination in a system of motor control for a grab bucket hoist or the like, an alternating current asynchronous hoisting and lowering drum main motor, a mechanically independent alternating current asynchronous closing drum main motor, and electrical equalizing connections between said motors comprising an auxiliary asynchronous motor of smaller capacity mechanically connected to each of said main motors and arranged to have a greater slip than the associated main motor, the said auxiliary motors having their rotors electrically interconnected and their stators energized to effect rotation of the rotors thereof in a direction opposite to the direction of rotation of the main motors.

3. In combination in a system of motor control for a grab bucket hoist or the like, an alternating current asnychronous hoisting and lowering drum main motor, a mechanically independent alternating current asynchronous closing drum main motor, and electrical equalizing connections between said motors comprising an auxiliary asynchronous motor of smaller capacity and higher synchronous speed mechanically connected to each of said main motors and arranged to have a greater slip than the associated main motor, the said auxiliary motors having their rotors electrically interconnected.

4. In combination in a system of motor control for a grab bucket hoist or the like, an alternating current asynchronous hoisting and lowering drum main motor, a mechanically independent alternating current asynchronous closing drum main motor, and electrical equalizing connections between said motors comprising an auxiliary asynchronous motor of smaller capacity and higher synchronous speed mechanically connected to each of said main motors and arranged to have a greater slip than the associated main motor, the said auxiliary motors having their rotors electrically interconnected and their stators energized to effect rotation of the rotors thereof in a direction opposite to the direction of rotation of the main motors.

5. In combination in a motor control system for a grab bucket hoist or the like, an alternating current asynchronous hoisting and lowering drum main motor, a mechanically independent alternating current asynchronous closing drum main motor, a controller for each of said motors, electrical equalizing connections between said motors comprising an auxiliary asynchronous motor of smaller capacity mechanically connected to each of said main motors and arranged to have a greater slip than the associated main motor, the said auxiliary motors having their rotors electrically interconnected, and connections through which the stators of said auxiliary motors are energized to effect rotation of the rotors thereof always in a direction to lift the grab when the controller for said hoisting and lowering drum main motor is operated to effect hoisting or lowering of the grab.

6. In combination in a motor control system for a grab bucket hoist or the like, an alternating current asynchronous hoisting and lowering drum main motor, a mechanically independent alternating current asynchronous closing drum main motor, a controller for each of said motors, electrical equalizing connections between said motors comprising an auxiliary asynchronous motor of smaller capacity mechanically connected to each of said main motors and arranged to have a greater slip than the associated main motor, the said auxiliary motors having their rotors electrically interconnected, and connections through which the stators of said auxiliary motors are energized to effect rotation thereof always in a direction to lift the grab when said controllers are operated to effect lowering of the open grab and the closing drum motor is automatically deenergized upon reaching substantially synchronous speed.

7. In a system of electric motor control, a plurality of mechanically independent main driving motors, and electrical equalizing connections between said motors comprising an auxiliary asynchronous motor of smaller capacity and higher synchronous speed than the full load speed of said main motors and mechanically connected to each of said main motors, the said auxiliary motors having their rotors electrically interconnected and their stators energized to effect rotation of the rotors in a direction opposite to the direction of rotation of the main motors.

In witness whereof, I have hereunto set my hand this 12th day of April, 1926.

CARL SCHIEBELER.